United States Patent [19]
Grove et al.

[11] 3,752,178
[45] Aug. 14, 1973

[54] VALVE CONSTRUCTION

[75] Inventors: Marvin H. Grove; Michael A. Karr, Jr., both of Houston, Tex. 77055

[73] Assignee: M & J Valve Company, Houston, Tex.

[22] Filed: May 15, 1972

[21] Appl. No.: 253,129

[52] U.S. Cl............ 137/246.22, 251/174, 251/317, 251/328
[51] Int. Cl.............................................. F16k 5/22
[58] Field of Search....................... 137/246, 246.14, 137/246.22; 251/174, 317, 328

[56] References Cited
UNITED STATES PATENTS
| | | | |
|---|---|---|---|
| 3,542,054 | 11/1970 | Works............................ | 137/246.22 |
| 3,378,026 | 4/1968 | Oliver............................ | 137/246.22 |
| 2,030,458 | 2/1936 | McKellar....................... | 137/246.22 |

Primary Examiner—Harold W. Weakley
Attorney—Paul D. Flehr et al.

[57] ABSTRACT

A valve having at least one sealing assembly comprising a metal seat ring carried by the valve body and urged toward the valve member by circumferentially disposed coil springs. The springs are disposed within an annular retainer formed of resilient material that is U-shaped in section and which seats within the body recess. The seat ring is sealed with respect to the body and carries resilient means for sealing with respect to the valve working surface of the valve member. Preferably means is provided for injecting a viscous sealant into a region adjacent the sealing means, and means is also provided for confining the viscous sealant to this region.

7 Claims, 3 Drawing Figures

Patented Aug. 14, 1973 3,752,178
2 Sheets-Sheet 1
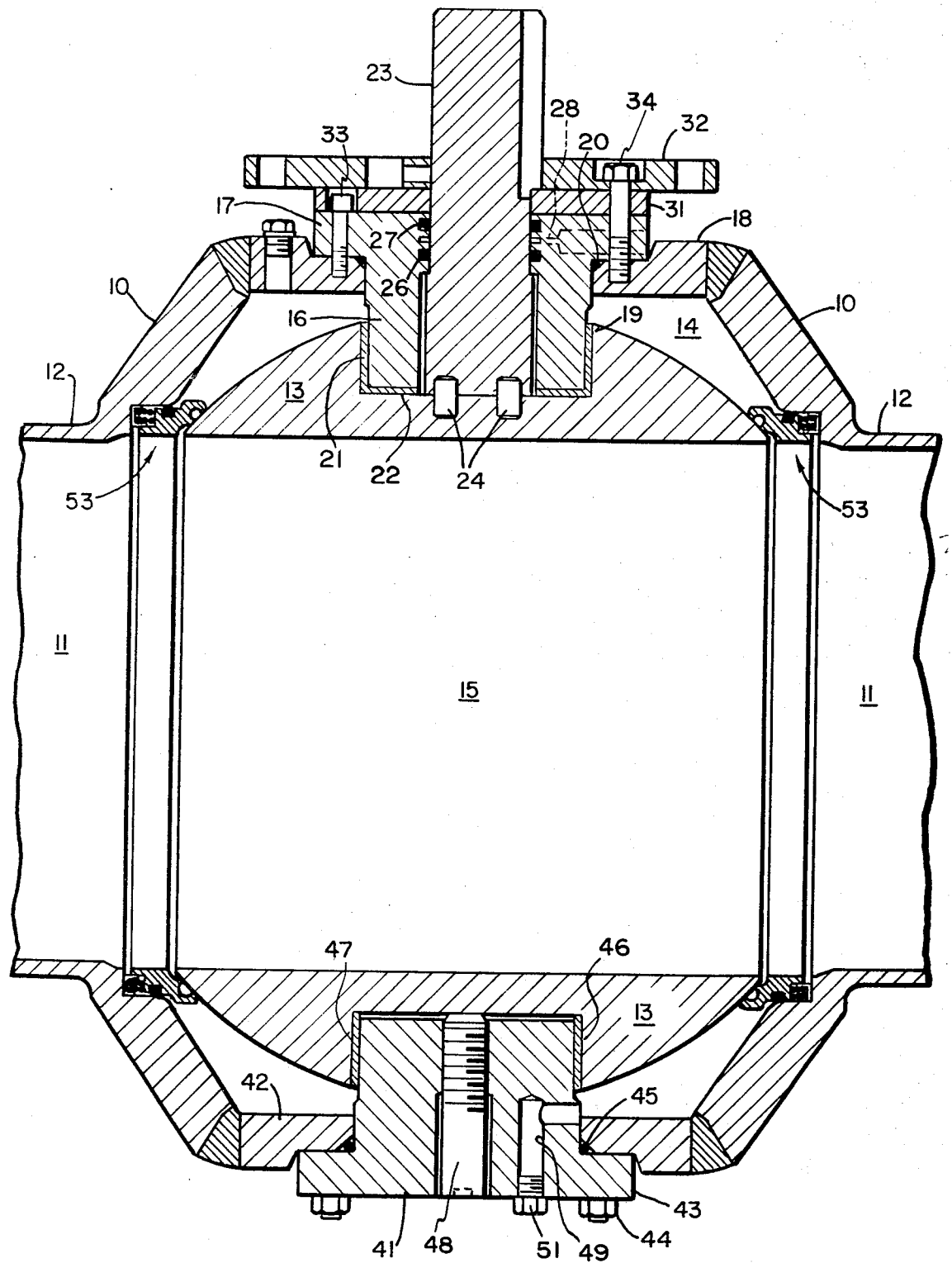
FIG _ 1

Patented Aug. 14, 1973  3,752,178
2 Sheets-Sheet 2
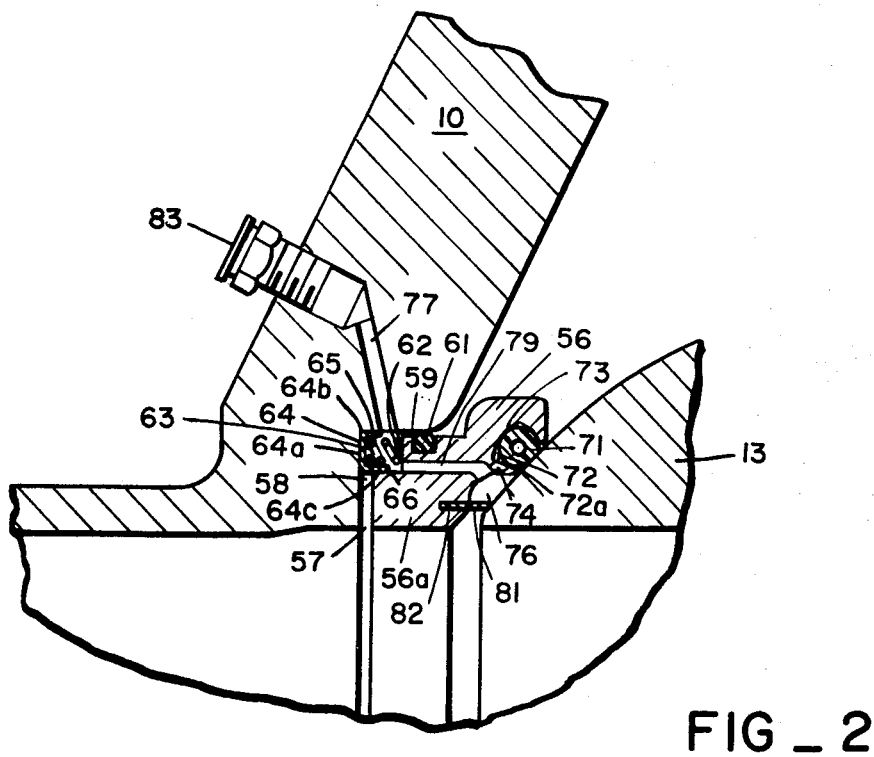
FIG_2
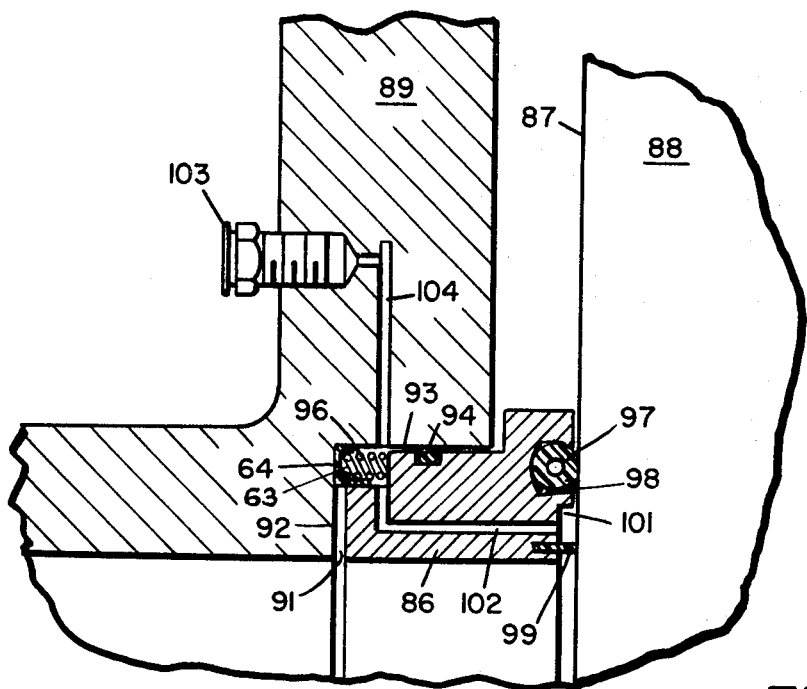
FIG_3

VALVE CONSTRUCTION

REFERENCE TO RELATED APPLICATIONS

Reference is made to copending application Ser. No. 188,097 showing a ball valve having certain features incorporated in the ball valve described herein, and applications Ser. No. 17,365 filed Mar. 9, 1970 and Ser. No. 176,801 filed Sept. 1, 1971, and now abandoned showing certain features of the sealing assembly described herein.

BACKGROUND OF THE INVENTION

In the construction of valves of the ball and gate types, particularly in the larger sizes that may range from 6 to 48 inches pipe size or larger, it is customary to use sealing assemblies that are carried by the valve body and which provide seals betwen the body and the valve member for closed position. As shown in U.S. Pat. Nos. 3,269,695 and 3,339,886, each assembly may consist of resilient sealing means adapted to contact the valve working surface of the valve member, and a plurality of circumferentially disposed coil springs for urging the seat ring toward the valve member. In the assembly shown in U.S. Pat. No. 3,339,886, the springs are pre-assembled with other parts of the assembly to facilitate factory assembly and replacement. This serves to facilitate proper location of the springs before the assembly is positioned within the recess of the valve body.

It has also been proposed to provide means for introducing a viscous sealant into a region adjacent the sealing means to promote effective sealing and to reduce operating forces. However, prior constructions for this purpose may permit the sealant to be injected into the flow passages of the valve. Also, the sealing assemblies constructed to permit injection of sealant have been relatively complicated with respect to the means employed for establishing seals between the assembly and the body. This means may, for example, employ two spaced O-rings between the assembly and the body, with the sealant being introduced into the space between the two rings and from thence conducted to the sealing surfaces.

SUMMARY OF THE INVENTION

The present invention relates generally to valves of the ball or gate types, and particularly to valves which may be made in the larger pipe sizes and which are provided with sealing means of non-metallic resilient material.

An object of the invention is to provide such valves with one or more sealing assemblies which are of simple construction and which have an arrangement permitting pre-assembly of the compression springs before these springs are positioned within the valve body recess.

Another object is to provide a valve of the above character in which the means which permits pre-assembly of the compression springs also serves to close the space occupied by the springs within the valve body whereby sealant can be introduced into this space for applying the same to the sealing surfaces of the valve.

Another object of the invention is to provide a valve having means for introducing a viscous sealant and which confines the sealant to a region adjacent the resilient sealing means which contacts the valve working surfaces of the valve member.

In general, the present invention makes use of a sealing assembly adapted to be accommodated within a recess formed in the valve body, and having its one end provided with resilient means for establishing sealing contact with the valve working surface of the valve member. The coil compression springs provided for urging the seat ring toward the valve member are accommodated within an annular retaining member formed of non-metallic resilient material, and which is U-shaped in cross-sectional configuration. This member also serves to close the space occupied by the compression springs whereby a viscous sealant can be introduced into this space and conducted to a region adjacent the resilient sealing means. Also the assembly preferably includes means likewise made of resilient material which is carried by the seat ring and which extends concentric to the resilient sealing means and radially spaced from the same to confine the region into which the sealant is introduced.

BRIEF DESCRIPTION OF THE DRAWING

Referring to the attached drawings:

FIG. 1 is a side elevational view partly in section illustrating a valve of the ball type incorporating the present invention.

FIG. 2 is an enlarged detail in section illustrating one of the sealing assemblies incorporated in FIG. 1.

FIG. 3 is a view like FIG. 2 but showing another embodiment of the sealing means suitable for use with valves of the gate type.

DESCRIPTION OF THE PREFERRED EMBOIDMENTS

The ball valve illustrated in FIG. 1 consists of a body 10 which may be fabricated by welding and is provided with aligned flow passages 11. The body hubs 12 may be arranged for welding to piping, or may be provided with conventional pipe coupling flanges. A valve ball 13 is disposed within the body space 14 and is provided with a port 15 adapted to register with flow passages 11 for open position of the valve. The body is rotatably carried by trunnion means to enable rotation through 90° between full open and closed positions.

The trunnion means for the upper end of the ball consists of the trunnion member 16 which has a flange 17 that is seated upon the upper wall portion 18 of the valve body. Its inner end portion extends within the bore 19 formed in the ball. It is sealed with respect to the body as by the resilient sealing means 20. Suitable bearing members 21 and 22 are interposed between the trunnion member 16 and the adjacent surfaces of the bore, and these may be made of a suitable non-metallic material like Teflon.

An operating shaft 23 extends through the trunnion member 16 and has its inner end coupled to the ball. Thus pins 24 are fitted into aligned openings formed in the ball and in the lower end of the shaft, thereby coupling the shaft to the ball. Axially spaced sealing means 26 and 27 serve to establish seals between the shaft and the trunnion member 16. Each of these seals may be of the resilient O-ring type. A duct 28 is shown communicating with the space between the sealing means 26 and 27 for the introduction of a viscous sealant or lubricant. This duct may be in communication with a suitable sealant injecting fitting.

A plate 31 is shown overlying the upper end of the trunnion and is between the trunnion and the mounting plate 32. Screws 33 serve to clamp the trunnion flange 17 against the body, and screws 34 may extend through the mounting plate 32, plate 31 and flange 17 and threaded into the body for clamping all of these parts together. The mounting plate facilitates the mounting of various types of operating devices upon the valve body.

The other trunnion means consists of the trunnion member 41 which extends through the body wall portion 42 and which has an exterior flange 43 which is clamped by screws 44. Suitable sealing means (e.g., a resilient O-ring) 45 prevents leakage between the trunnion member 41 and the body. The inner end of the trunnion member is accommodated within the bore 46 formed in the valve ball, and bearing means 47, such as a sleeve formed of Teflon, serves to provide proper journalling. An adjustable thrust plug 48 has threaded engagement with the trunnion member 41 and is capable of adjustment from the exterior of the valve for the purpose of adjusting the position of the valve ball with respect to the flow passages 11. The trunnion member 41 is also shown provided with a duct 49 which is normally closed by plug 51, and which makes possible draining material from the valve body.

Annular sealing assemblies 53 are shown carried by the body and serve to establish seals between the body and the valve ball. Although two of these assemblies are illustrated, in some instances one assembly will suffice. The preferred construction for each assembly is shown in FIG. 2. It consists of a seat ring 56 which is relatively rigid and which can be made of suitable metal. One end portion 56a of this ring is accommodated in a recess 57 formed in the valve body. The recess in section is defined by the flat shoulder surface 58 and the cylindrical peripheral surface 59. A seal is established between portion 56a of the seat ring and the peripheral surface 59 by sealing means 61, which preferably is of the resilient O-ring type. The portion 56a of the seat ring is machined to provide the thrust shoulder 62 and the annular space 63. Within the space 63 there is an annular member 64 and also the coil compression springs 65.

The member 64 is made of suitable non-metallic resilient material, such as extrudable nylon, and it is generally U-shaped in section as illustrated. It is so dimensioned that the coil springs 65 have a snug fit within the same. Also it is so dimensioned that its base wall 64a is in contact with the shoulder surface 57 of the body recess, its outer wall portion 64b in contact with the peripheral cylindrical surface 59 of the recess, and its inner portion 64c in contact with the cylindrical surface 66 provided on the seat ring portion 56a. Preferably the wall portion 64b is somewhat shorter than portion 64c.

In practice the springs are assembled together with the member 64 before any parts of the assembly are inserted into the valve. As previously mentioned, the dimensioning of the member 64 is such that when the coil springs are inserted there is a snug fit whereby the springs are frictionally retained in proper circumferential positioning. Thereafter this subassembly can be positioned in the surface 57 of the body recess and in contact with the outer wall portion 64b preparatory to inserting the seat ring into the body recess.

The other end portion of the seat ring which is adjacent the valve ball is provided with resilient sealing means which is urged by the thrust of the springs against the valve working surface of the ball. In FIG. 2 the resilient sealing means illustrated is of the type disclosed in the above mentioned application Ser. No. 17,365. It consists of a ring 71 made of relatively hard resilient material like nylon having a durometer hardness on the A scale ranging from 60 to 85, together with another annular member 72 made of softer resilient material, such as a suitable synthetic rubber or elastomer having a durometer hardness on the D scale ranging from 85 to 90. Both members 71 and 72 are disposed and locked within a recess 73 in the seat ring and are held in radial compression. An annular lip 74 is shown integral with the seat ring 56, and at the time the members 71 and 72 are assembled within the recess 73, the lip 74 can be bent by a suitable machine operation to cause the members 71 and 72 to be place under radial compression and to effectively lock these members within the recess 73. Thereafter both the members 71 and 72 are machined to engage the annular valve working surfaces of the ball. The exterior edge 72a of the resilient member 72 serves to engage and contact the valve surfaces of the ball to establish a seal which is effective for relatively low pressure differentials.

With the sealing assembly described above, it is desirable to provide means for introducing a viscous sealant into the annular region 76 adjacent the resilient sealing means. For this purpose, a duct 77 is shown in the valve body and is in communication with the space 63 occupied by the compression spring 65. The seat ring is shown provided with one or more ducts 79 which serve to convey sealant into the region 76. The dimensioning of wall portion 64b facilitates location and drilling of the duct 77.

Means is provided for confining the sealant to the region 76, thus preventing it from being injected into the flow passages of the valve. For this purpose there is shown a ribbon-like member 81 made of suitable resilient material like nylon, and which is inserted and retained within a recess or slot 82 formed in the seat ring. One edge of this ribbon terminates in close relationship or in contact with the valve ball. A suitable fitting 83 is carried by the body whereby sealant under pressure can be introduced through this fitting and through duct 77 into the space 63 and from thence through ducts 79 into the region 76.

The sealing assembly described above has a number of desirable features. The construction is relatively inexpensive to manufacture, and assembly of the parts is greatly simplified. The annular member 64 which is U-shaped in section not only serves to retain the coil springs during and after assembly, but in addition provides sufficient sealing means to retain lubricant introduced into the space 63 under pressure, thus causing such sealant to be introduced into the region 76. The sealant when introduced into the region 76, which is immediately adjacent the inner periphery of the resilient sealing means, is prevented from being injected into the flow passages of the valve by the retaining ribbon 81.

FIG. 3 illustrates parts of a gate valve with another embodiment of the sealing assembly. In this instance the seat ring 86 has one end portion adapted to cooperate with the surface 87 of the valve gate 88.

The general character of the gate valve may be as shown in U.S. Pat. No. 3,481,580. The valve body 89 is machined to provide the recess 91 which is defined by the shoulder surface 92 and the cylindrical peripheral surface 93. Sealing means 94 of the resilient O-ring type serves to establish a seal between the seat ring 86 and the peripheral surface 93 of the body. The member 64 is the same as in FIG. 2 and serves to accommodate the coil compression springs 96. The seat ring also carries the annular member 97 corresponding to the member 71 of FIG. 2, and the more resilient member 98 corresponding to the member 72 of FIG. 2. These members are finished to engage the valve working surface 87 of the gate. The seat ring is also provided with a ribbon-like member 99 of non-metallic material like nylon, corresponding to the member 81 of FIG. 2, and serving to retain sealant in the region 101. One or more ducts 102 are provided in the seat ring and serve to connect the space occupied by the springs 96 with the region 101. The body is provided with an exterior fitting 103 for the introduction of viscous sealant under pressure, and this connects with the space occupied by the springs 96 through duct 104.

The assembly shown in FIG. 3 functions in substantially the same manner as described in connection with FIG. 2. The compression springs are pre-assembled in the U-shaped member 64, and the fit between the springs and the inner and outer side walls of member 64 is sufficient to retain the springs in the positions desired. This assembly is then fitted upon the seat ring 86, after which the seat ring is inserted into the recess 91 of the body. While the member 64 is not intended to form a fluid-tight seal, it does form a sufficient seal to retain viscous sealant introduced through the fitting 103 whereby such sealant can be introduced under pressure through duct 102 into the region 101.

In connection with both assemblies, FIGS. 2 and 3, it is assumed that a seal is to be maintained upon the upstream side of the valve. Thus in FIG. 2 the diameter of the recess surface 59 which is engaged by the sealing members 61 is somewhat greater than the diameter of the face 72a of member 72, which establishes a seal with respect to the ball. Thus assuming that there is a pressure differential between the upstream flow passage and the body space, the line pressure urges the seat ring toward the valve ball. Substantially the same proportioning is shown in FIG. 3. In the event pressure differential is applied in the reverse direction, or in other words, in the event the pressure in the valve body exceeds the pressure in the upstream flow passage, such pressure is automatically relieved past the sealing means, either by slight retraction of the seat ring away from the valve ball, or by escape of such pressure past the face 72a of the member 72.

With respect to the ball valve shown in FIG. 1, the valve ball is carried by the trunnions in such a manner that it carries the thrust of line pressure when in closed position. Thus the thrust of line pressure is not carried by the sealing assembly upon the downstream side of the valve. With a gate valve of the type referred to above, line pressure against the closed gate urges the gate against the downstream seat ring 86 whereby this seat ring is pressed against the surface 92. Also the resilient sealing means is compressed to permit the downstream side of the gate to directly contact the metal face of the seat ring.

We claim:

1. In a valve construction, a valve body having aligned flow passages, a valve member disposed within the body and movable between open and closed positions to control flow through the passages, a sealing assembly surrounding one of the flow passages and carried by the body, said assembly including a seat ring, the body having a recess serving to accommodate one portion of the seat ring, the recess in section being defined by an end shoulder and a peripheral surface that is cylindrical, sealing means of resilient non-metallic material carried by the other end portion of the seat ring, the valve member having an annular valve surface formed thereon which surrounds said one passage for closed position of the valve member and which is disposed to engage said sealing means, means forming a seal between said first-named seat ring portion and the body, a plurality of circumferentially disposed compression springs disposed within the body recess and engaging said seat ring to urge the same toward the valve member, and spring accommodating means comprising an annular member made of resilient non-metallic material, said member being U-shaped in section and dimensioned to seat against the shoulder of the recess, said springs being accommodated within said member.

2. A valve as in claim 1 in which said annular member made of non-metallic resilient material has its outer peripheral wall portion on contact with the peripheral surface of the recess and its inner wall portion in contact with the seat ring.

3. A valve construction as in claim 2 in which the outer wall portion is shorter than the inner wall portion to facilitate introduction of sealant.

4. A valve as in claim 2 together with means for introducing a viscous sealant into the recess space occupied by the springs.

5. A valve construction as in claim 4 in which the seat ring is provided with a duct serving to conduct viscous sealant from the space occupied by the springs to a region near the resilient sealing means engaging the valve member.

6. A valve construction as in claim 5 together with sealant retaining means carried by the seat ring and serving to enclose the said region into which sealant is introduced, said last means comprising a member of resilient material disposed concentric to and spaced radially from the sealing means.

7. In a valve construction, a valve body having aligned flow passages, a valve member disposed within the body and movable between open and closed positions to control flow of fluid through the passages, at least one sealing assembly surrounding one of the flow passages and carried by the body, said assembly including a relatively rigid seat ring, the body having a recess serving to accommodate one portion of the seat ring, means forming a fluid-tight seal between one end portion of said seat ring and the body, sealing means of resilient non-metallic material carried by the other end portion of the ring, said valve member having an annular surface formed thereon which surrounds said one passage for closed position of the valve and which is disposed to engage said resilient sealing means, means for introducing a viscous sealant into the region adjacent said sealing means, and sealant retaining means carried by the seat ring and serving to enclose said region, said last means comprising a ribbon-like member of resilient non-metallic material mounted upon the seat ring and disposed concentric to and spaced radially from the sealing means.

* * * * *